US008838768B2

(12) United States Patent
Hirana et al.

(10) Patent No.: US 8,838,768 B2
(45) Date of Patent: Sep. 16, 2014

(54) COMPUTER SYSTEM AND DISK SHARING METHOD USED THEREBY

(75) Inventors: Ryo Hirana, Yokohama (JP); Keisuke Hatasaki, Kawasaki (JP); Toshiaki Arai, Machida (JP)

(73) Assignee: Hitachi, Ltd., Tokyo (JP)

( * ) Notice: Subject to any disclaimer, the term of this patent is extended or adjusted under 35 U.S.C. 154(b) by 288 days.

(21) Appl. No.: 13/486,530

(22) Filed: Jun. 1, 2012

(65) Prior Publication Data

US 2012/0324039 A1      Dec. 20, 2012

(30) Foreign Application Priority Data

Jun. 14, 2011   (JP) .................. 2011-131806

(51) Int. Cl.
*G06F 15/173*  (2006.01)
*G06F 3/06*  (2006.01)
*G06F 9/50*  (2006.01)

(52) U.S. Cl.
CPC ............ *G06F 3/0604* (2013.01); *G06F 3/0631* (2013.01); *G06F 3/0664* (2013.01); *G06F 3/067* (2013.01); *G06F 9/5077* (2013.01)
USPC ........................................................ 709/223

(58) Field of Classification Search
USPC ................ 709/201–203, 213–215, 221, 223; 718/104
See application file for complete search history.

(56) References Cited

U.S. PATENT DOCUMENTS

| | | | | |
|---|---|---|---|---|
| 5,473,773 A | * | 12/1995 | Aman et al. .................. | 718/104 |
| 5,487,170 A | * | 1/1996 | Bass et al. ..................... | 710/244 |
| 5,675,739 A | * | 10/1997 | Eilert et al. ................... | 709/226 |
| 5,935,205 A | | 8/1999 | Murayama et al. | |
| 6,587,938 B1 | * | 7/2003 | Eilert et al. ..................... | 712/29 |
| 6,721,568 B1 | * | 4/2004 | Gustavsson et al. .......... | 455/450 |
| 7,140,020 B2 | * | 11/2006 | McCarthy et al. ............ | 718/104 |
| 7,337,299 B2 | * | 2/2008 | Sakaki et al. ................. | 711/203 |
| 7,426,624 B2 | * | 9/2008 | Fukuguchi et al. ........... | 711/173 |
| 7,487,328 B2 | * | 2/2009 | Sakaki et al. ................. | 711/203 |
| 7,844,795 B2 | * | 11/2010 | Sakaki et al. ................. | 711/203 |
| 7,849,278 B2 | * | 12/2010 | Sato et al. ...................... | 711/161 |
| 7,873,619 B1 | * | 1/2011 | Faibish et al. ................. | 707/705 |
| 8,046,562 B2 | * | 10/2011 | Sakaki et al. ................. | 711/203 |
| 8,095,577 B1 | * | 1/2012 | Faibish et al. ................. | 707/823 |
| 2003/0204683 A1 | * | 10/2003 | Okumoto et al. ............. | 711/147 |
| 2006/0080502 A1 | * | 4/2006 | Sakaki et al. ................. | 711/112 |
| 2006/0090048 A1 | | 4/2006 | Okumoto et al. | |

(Continued)

FOREIGN PATENT DOCUMENTS

JP        H09-006706 A    1/1997
JP        2006-127028 A   5/2006

*Primary Examiner* — Sargon Nano
(74) *Attorney, Agent, or Firm* — Volpe and Koenig, P.C.

(57) ABSTRACT

A first server including a local disk and a second server are logically partitioned by virtualization units. The first and second servers each have a storage controller LPAR with a local disk sharing function running thereon. The storage controller LPARs running on the first and second servers communicate with each other. When a disk I/O command issued by the second LPAR running on the second server is transferred to the local disk of the first server, the second LPAR reads data stored in the local disk or writes data thereto. In this way, the local disk is shared.

12 Claims, 14 Drawing Sheets

(56) References Cited

U.S. PATENT DOCUMENTS

| | | | |
|---|---|---|---|
| 2006/0095700 A1* | 5/2006 | Sato et al. | 711/165 |
| 2006/0212673 A1* | 9/2006 | Fukuguchi et al. | 711/173 |
| 2007/0162718 A1* | 7/2007 | Sato et al. | 711/165 |
| 2008/0016311 A1* | 1/2008 | Harada | 711/170 |
| 2008/0046671 A1* | 2/2008 | Sato et al. | 711/162 |
| 2008/0155128 A1* | 6/2008 | Sakaki et al. | 710/3 |
| 2009/0077343 A1* | 3/2009 | Sakaki et al. | 711/206 |
| 2010/0082922 A1 | 4/2010 | George et al. | |
| 2011/0040934 A1* | 2/2011 | Sakaki et al. | 711/113 |
| 2013/0007339 A1* | 1/2013 | Deguchi | 711/100 |

* cited by examiner

DISK ALLOCATION TABLE

| DISK ID | DISK TYPE | PHYSICAL DISK ADAPTER ID | VIRTUAL DISK ADAPTER ID | LPAR ID |
|---|---|---|---|---|
| Disk1-1 | HDD | pHBA1-1 | vHBA1-1<br>vHBA1-2 | LPAR1-1<br>LPAR1-2 |
| vDisk2-1 | VIRTUAL | | vHBA2-1 | LPAR2-1 |

STORAGE CONTROLLER MANAGEMENT TABLE

| STORAGE CONTROLLER ID | STORAGE CONTROLLER TYPE | ADDRESS | MANAGED DISK | MANAGED LPAR |
|---|---|---|---|---|
| LPAR1-2 | LPAR | 192.0.2.10 | Disk1-1 | LPAR1-1 |
| LPAR2-2 | LPAR | 192.0.2.20 | vDisk2-1 | LPAR2-1 |

DISK SHARING TABLE

| LOCAL DISK ID | FIRST LPAR ID | VIRTUAL DISK ID | SECOND LPAR ID |
|---|---|---|---|
| Disk1-1 | LPAR1-1 | vDisk2-1 | LPAR2-1 |

DISK ALLOCATION TABLE

| DISK ID | DISK TYPE | PHYSICAL DISK ADAPTER ID | VIRTUAL DISK ADAPTER ID | LPAR ID |
|---|---|---|---|---|
| Disk1-1 | HDD | pHBA1-1 | vHBA1-1 | LPAR1-1 |

501  502  503  504  505

412

STORAGE CONTROLLER MANAGEMENT TABLE

| STORAGE CONTROLLER ID | STORAGE CONTROLLER TYPE | ADDRESS | MANAGED DISK | MANAGED LPAR |
|---|---|---|---|---|
| LPAR1-2 | LPAR | 192.0.2.10 | Disk1-1 | LPAR1-1 |
| LPAR2-2 | LPAR | 192.0.2.20 |  | LPAR2-1 |

601  602  603  604  605

413

DISK SHARING TABLE

| LOCAL DISK ID | FIRST LPAR ID | VIRTUAL DISK ID | SECOND LPAR ID |
|---|---|---|---|

DISK ALLOCATION TABLE

| DISK ID | DISK TYPE | PHYSICAL DISK ADAPTER ID | VIRTUAL DISK ADAPTER ID | LPAR ID |
|---|---|---|---|---|
| Disk1-1 | HDD | pHBA1-1 | vHBA1-1<br>vHBA1-2 | LPAR1-1<br>LPAR1-2 |
| 501 | 502 | 503 | 504 | 505 |

412

STORAGE CONTROLLER MANAGEMENT TABLE

| STORAGE CONTROLLER ID | STORAGE CONTROLLER TYPE | ADDRESS | MANAGED DISK | MANAGED LPAR |
|---|---|---|---|---|
| LPAR1-2 | LPAR | 192.0.2.10 | Disk1-1 | LPAR1-1 |
| LPAR2-2 | LPAR | 192.0.2.20 |  | LPAR2-1 |
| 601 | 602 | 603 | 604 | 605 |

413

DISK SHARING TABLE

| LOCAL DISK ID | FIRST LPAR ID | VIRTUAL DISK ID | SECOND LPAR ID |
|---|---|---|---|
| Disk1-1 | LPAR1-1 |  | LPAR2-1 |
| 701 | 702 | 703 | 704 |

DISK ALLOCATION TABLE

| DISK ID | DISK TYPE | PHYSICAL DISK ADAPTER ID | VIRTUAL DISK ADAPTER ID | LPAR ID |
|---|---|---|---|---|
| Disk1-1 | HDD | pHBA1-1 | vHBA1-1<br>vHBA1-2 | LPAR1-1<br>LPAR1-2 |
| vDisk2-1 | VIRTUAL | | | LPAR2-1 |

501　502　503　504　505

412

STORAGE CONTROLLER MANAGEMENT TABLE

| STORAGE CONTROLLER ID | STORAGE CONTROLLER TYPE | ADDRESS | MANAGED DISK | MANAGED LPAR |
|---|---|---|---|---|
| LPAR1-2 | LPAR | 192.0.2.10 | Disk1-1 | LPAR1-1 |
| LPAR2-2 | LPAR | 192.0.2.20 | vDisk2-1 | LPAR2-1 |

601　602　603　604　605

413

DISK SHARING TABLE

| LOCAL DISK ID | FIRST LPAR ID | VIRTUAL DISK ID | SECOND LPAR ID |
|---|---|---|---|
| Disk1-1 | LPAR1-1 | | LPAR2-1 |

701　702　703　704

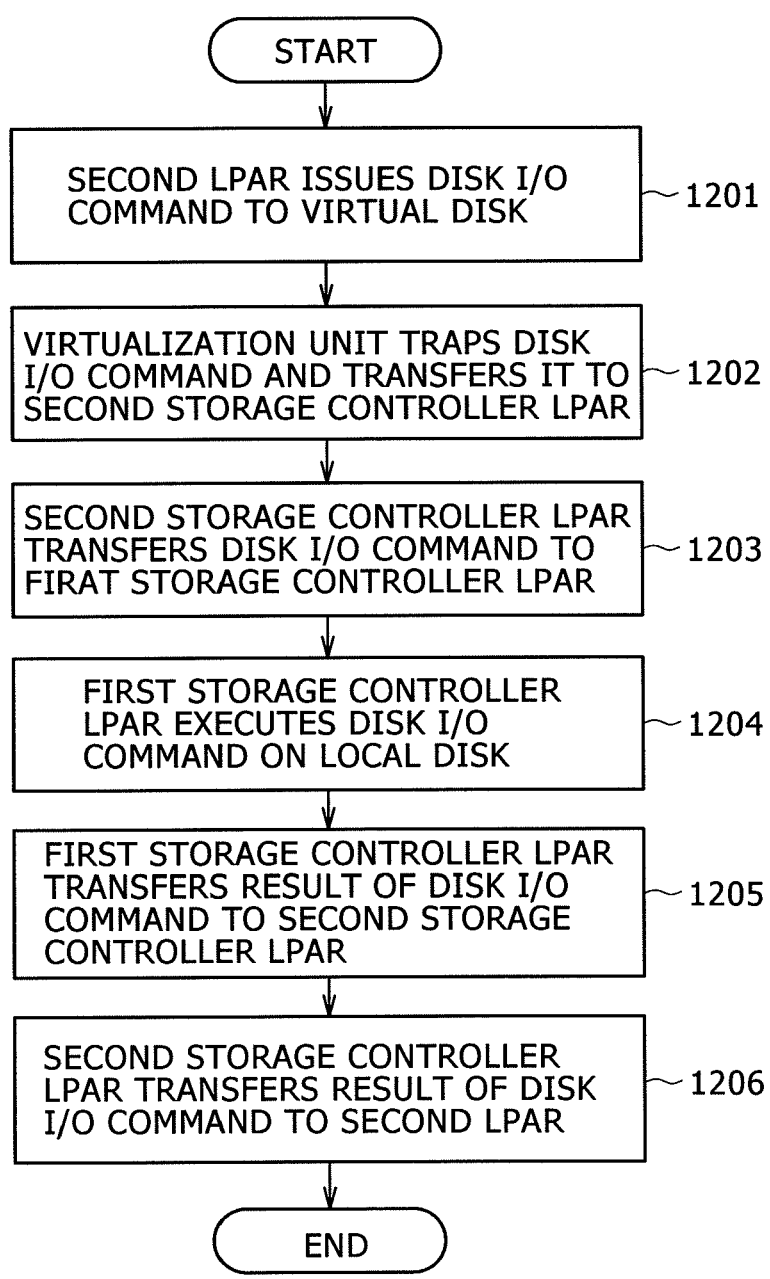

COMPUTER SYSTEM AND DISK SHARING METHOD USED THEREBY

This application claims the benefit of priority from Japanese Application No. 2011-131806, filed on Jun. 14, 2011, which is incorporated by reference as if fully set forth.

FIELD OF INVENTION

The present invention relates to a method and system for sharing data between multiple physical servers.

BACKGROUND OF THE INVENTION

Generally, corporate information systems have shared storage, where multiple physical servers access a single storage device and share data in the storage device. Use of such a configuration allows data to be controlled centrally, as well as allows the hot-standby function, the backup function, or the like for enhancing the availability of the servers to be used effectively. In a server virtualization environment, the migration function which is an ability to migrate a virtual server from currently running physical server to another physical server, requires shared storage. Because it is needed to refer data each other. Because it need to refer the same data between the source and destination physical servers to execute migration. Shared storage is constructed using the NAS (Network Attached Storage) technology, in which a file is shared between different servers, or the SAN (Storage Area Network) technology, in which block storage is shared using a protocol such as FC (Fibre Channel) or iSCSI (Internet Small Computer System Interface).

On the other hand, there are corporate information systems which do not need shared storage. Examples of such systems include distributed processing systems of big data, typified by Hadoop, and Web server load balancing systems using a load balancer. In these systems, different servers do not need to share data. Therefore servers often use the local disks to store data rather than using shared storage.

Currently, both these two types of corporate information systems, which are different in data storage place, exist in the same environment. Which of the local disk and shared storage should be used as a data storage place is determined depending on the requirements for the corporate information system. Since a local disk is generally cheaper than shared storage, corporations seeking to reduce cost desire to use local disks.

SUMMARY OF THE INVENTION

When corporations use local disks in order to reduce cost, they face the problem of whether the disks can be shared. This problem will be described using a case where both first and second servers in a system include a local disk and have first and second programs, respectively, running thereon. The first program running on the first server can perform an I/O operation to a first local disk via a first disk adapter included in the first server. However, the first program cannot perform an I/O operation to a second local disk included in the second server, since the first disk adapter is not connected to the second local disk. An I/O operation as used herein refers to reading data stored in the local disk or writing data thereto. This means that the first and second programs present on the different servers cannot share data.

Useful functions such as backup and migration require sharing of disks. For this reason, even when corporations desire to use local disks in order to reduce cost, they must use expensive, shared storage so long as they want to use such functions.

That is, a problem with the related art is that multiple physical servers cannot share local disks thereof.

US 2010/0082922 discloses a technology that achieves live migration of a virtual server in an environment where both the source and destination physical servers include a local disk and do not share data. The technology of US2010/0082922 achieves live migration using local disks by quasi-data sharing. This technology dispose small-capacity shared storage accessible from both the source and destination physical servers and place not the contents of data but differential snapshots in the shared storage. However, this technology uses the small-capacity storage. That is, a storage device must be disposed independently of the two servers in order to share data, thereby taking cost. In this respect, this technology is the same as the traditional art.

A disk sharing system according to an aspect of the present invention includes multiple physical servers and a management server connected to the physical servers. A first physical server includes a local disk, a first virtualization unit, and a first LPAR and a first storage controller LPAR logically partitioned by the first virtualization unit. A second physical server includes a second virtualization unit, a second LPAR and a second storage controller LPAR logically partitioned by the second virtualization unit, and a virtual disk generated by the second storage controller by emulating the local disk of the first physical server. The first storage controller LPAR and the second storage controller LPAR communicate with each other. In this system, the second storage controller LPAR transfers a disk I/O command to be executed to the virtual disk issued by the second LPAR to the first storage controller LPAR. The first storage controller LPAR obtains an identifier of the local disk contained in the disk I/O command by referring to the disk I/O command and executes the disk I/O command to the local disk having the identifier obtained.

According to the aspect of the present invention, in a system including multiple physical servers, a program running on a physical server can share a local disk included in a different physical server.

BRIEF DESCRIPTION OF THE DRAWINGS

FIG. 5 is a diagram showing an example of a disk allocation table according to the first embodiment;

FIG. 6 is a diagram showing an example of a storage controller management table according to the first embodiment;

FIG. 7 is a diagram showing an example of a disk sharing table according to the first embodiment;

FIG. 9B is a diagram showing an example of management tables before starting to share a disk according to the first embodiment;

FIG. 10B is a diagram showing an example of management tables in the local disk access step according to the first embodiment;

FIG. 11B is a diagram showing an example of management tables in the virtual disk generation step according to the first embodiment; and FIG. 12 is a flowchart showing an example of a disk I/O operation according to the first embodiment.

DETAILED DESCRIPTION OF THE PREFERRED EMBODIMENTS

First Embodiment

Before describing the present invention, it is assumed that: a system includes multiple physical servers, first and second physical servers, and a management server for managing the physical servers; each physical server include a local disk; each physical server is logically partitioned by a virtualization unit; the LPARs (logical partitions) obtained are running on the virtualization unit and perform an I/O operation to the local disk; the storage controller LPARs obtained are running on the virtualization unit and provide an ability to share the local disk of the other physical server; and a first storage controller LPAR running on the first physical server and a second storage controller LPAR running on the second physical server communicate with each other via a network.

In the present invention, when a first LPAR running on the first physical server performs an I/O operation to the local disk and a second LPAR running on the second physical server needs to share that local disk, the first and second storage controller LPARs share information about that local disk and LPARs, via reading and writing management information stored in the management server. Subsequently, the second storage controller LPAR transfers a disk I/O command issued by the second LPAR to the first storage controller LPAR. Thus, the second LPAR reads data stored in the local disk included in the first server or writes data thereto. In this way, the local disk is shared. Now, a system according to an embodiment of the present invention will be described with reference to the accompanying drawings. A first embodiment provides the configuration of a system where a first server including a local disk to be shared, a first LPAR using the local disk, and a first storage controller LPAR for managing the local disk, a second server including a second LPAR and a second storage controller LPAR, and a management server work together and thus the second LPAR running on the second server shares the local disk included in the first server. The first embodiment also provides a method for sharing the local disk.

Figure 1:
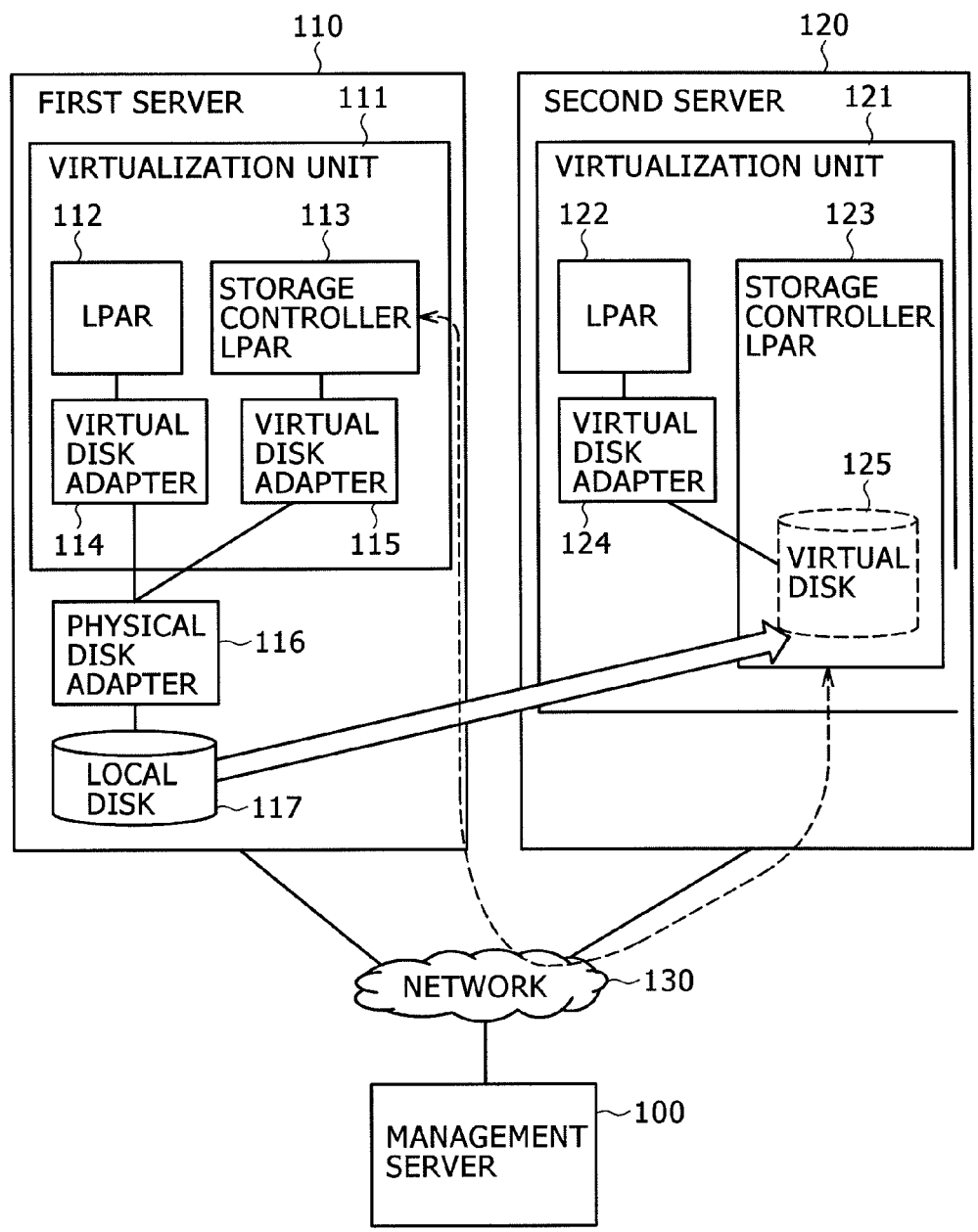
FIG. 1 is a diagram showing an example configuration of a disk sharing system according to a first embodiment.

FIG. 1 is a diagram showing an example configuration of a disk sharing system.

The disk sharing system includes a management server 100, a first server 110, a second server 120, and a network 130. The management server 100, the first server 110, and the second server 120 are physical servers and connected together via a network 130.

The first server 110 has a virtualization unit 111 running thereon, and the virtualization unit 111 has a first LPAR 112 and a first storage controller LPAR 113 running thereon. The first server 110 also includes a physical disk adapter 116 and a local disk 117 connected to the physical disk adapter 116.

The first LPAR 112 accesses the local disk 117 via a virtual disk adapter 114 and the physical disk adapter 116. The first LPAR 112 issues a disk I/O command to the virtual disk adapter 114 to read data stored in the local disk 117 or write data thereto.

The first storage controller LPAR 113 is connected to a virtual disk adapter 115 and the physical disk adapter 116. As with the first LPAR 112, it reads data stored in the local disk 117 or writes data thereto.

The two virtual disk adapters, 114 and 115, are generated and allocated to the first LPAR 112 and the first storage controller LPAR 113, respectively, by the virtualization unit 111.

As with the first server 110, the second server 120 has a virtualization unit 121 running thereon, and the virtualization unit 121 has a second LPAR 122 and a second storage controller LPAR 123 running thereon. As with the first server 110, the second server 120 may include a physical disk adapter and a local disk.

The second LPAR 122 on the second server 120 accesses a virtual disk 125 on the second storage controller LPAR 123 via a virtual disk adapter 124. The virtual disk adapter 124 is generated and allocated to the second LPAR 122 by the virtualization unit 121.

The virtual disk 125 is a physically nonexistent, virtual disk generated by software of the second storage controller LPAR 123. The virtual disk 125 corresponds to the local disk 117 on the first server 110. When the second LPAR 122 issues a disk I/O command to the virtual disk 125 via the virtual disk adapter 124, the virtualization unit 121 traps the disk I/O command and transfers it to the second storage controller LPAR 123. The second storage controller LPAR 123 then passes the disk I/O command to the first storage controller LPAR 113 via the network 130. Based on the disk I/O command, the first storage controller LPAR 113 performs an I/O operation to the local disk 117. The first storage controller LPAR 113 then passes the result of the I/O operation to the second LPAR 122 via the network 130 and the second storage controller LPAR 123.

Figure 2:
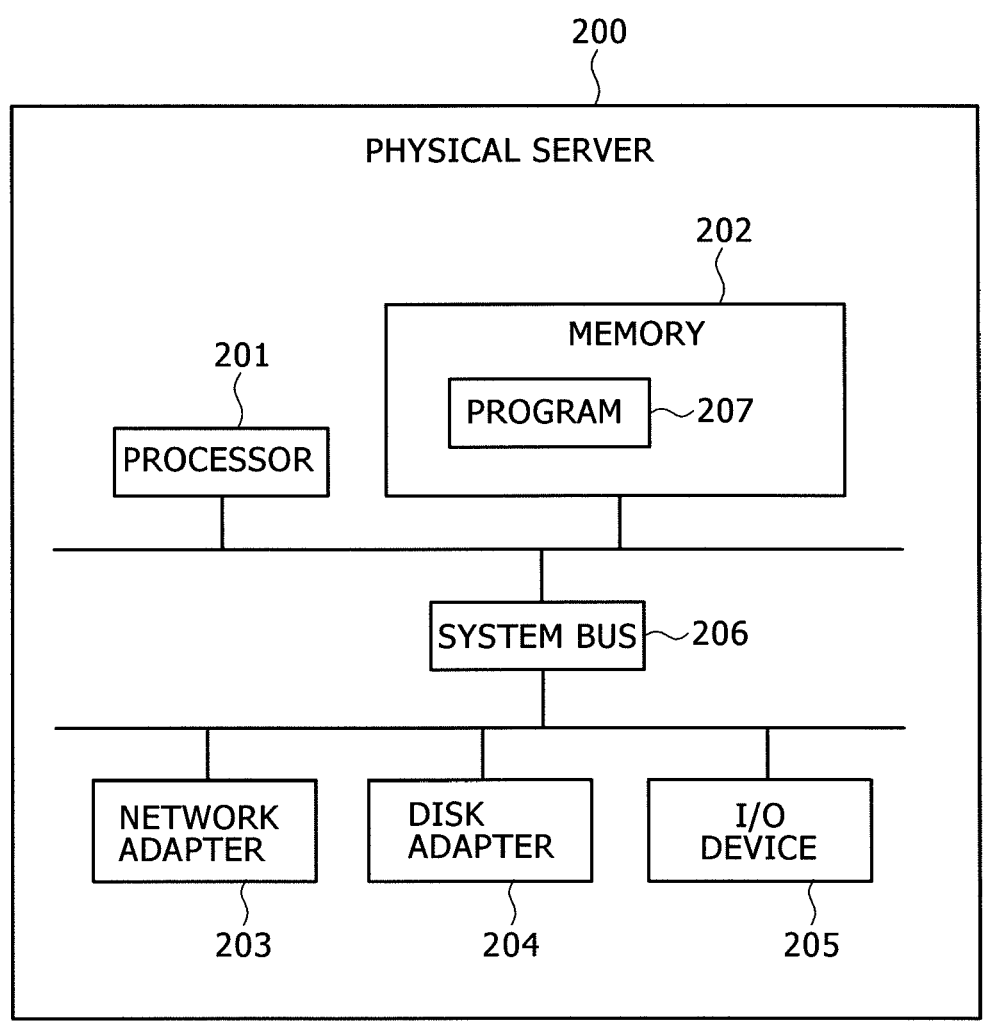
FIG. 2 is a diagram showing an example configuration of a physical server according to the first embodiment.

FIG. 2 is a diagram showing an example configuration of a physical server. The management server 100, the first server 110, and the second server 120 in FIG. 1 are each such a physical server.

A physical server 200 includes a processor 201, a memory 202, a network adapter 203 connected to a network such as the network 130, a disk adapter 204 connected to storage media such as the local disk 117, and an I/O device 205 such as a keyboard or display, and these components are connected together via a system bus 206. The network adapter 203 may be composed of multiple network adapters and may be connected to a network other than the network 130. The disk adapter 204 may be composed of multiple disk adapters and may be connected to storage media other than the local disk 117, such as shared storage.

The processor 201 previously loads a program 207 from the storage media connected to the disk adapter 204 into the memory 202 and then executes it to perform a process written therein.

Figure 3:
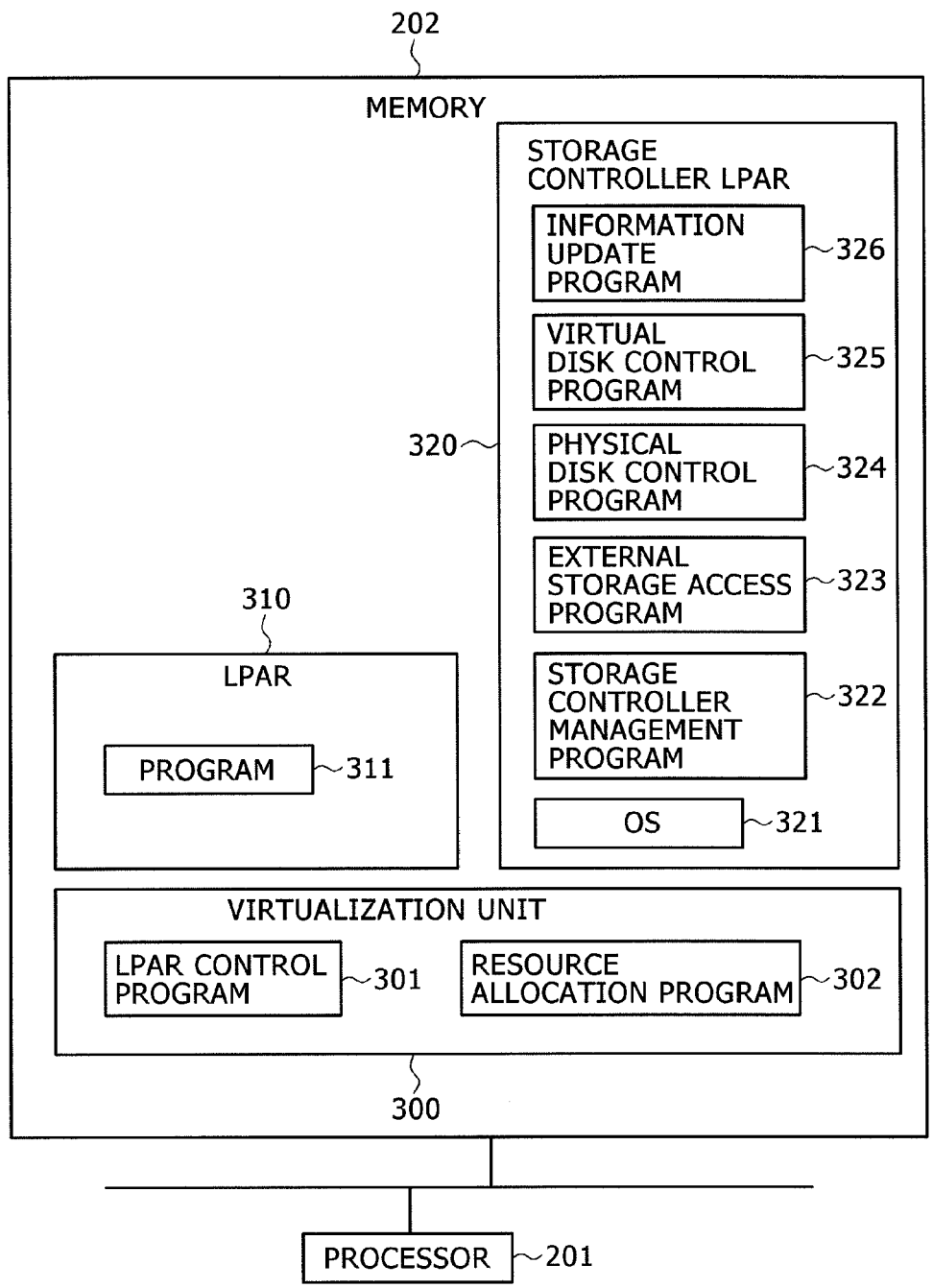
FIG. 3 is a diagram showing an example detailed configuration of a storage controller LPAR according to the first embodiment.

FIG. 3 is a diagram showing an example configuration of a storage controller LPAR running on the physical server 200. A virtualization unit 300, an LPAR 310, and a storage controller LPAR 320 correspond to the program 207.

The virtualization unit 300 is a program including an LPAR control program 301 and a resource allocation program 302. The LPAR control program 301 has functions such as the creation or deletion of the LPAR 310 and the storage controller LPAR 320. The resource allocation program 302 has the function of logically partitioning the resource of the physical server 200 and allocating the logically partitioned resources to the LPAR 310 and the storage controller LPAR 320. This function allows multiple programs such as the LPAR 310 and the controller LPAR 320 to run on the same physical server 200.

The LPAR 310 executes a program 311 using the resource allocated by the virtualization unit 300. The program 311 executed by the LPAR 310 is, for example, an OS, an application, a virtualization unit, or the like.

The storage controller LPAR 320 is a type of the LPAR and includes an OS 321, as well as a storage controller management program 322, an external storage access program 323, a physical disk control program 324, a virtual disk control program 325, and an information update program 326. These programs are stored in the memory 202 along with the storage controller LPAR 320. The storage controller LPAR 320 is a virtual appliance configured to install the programs 322 to 326 on the OS 321 and allow them to run on the LPAR 310 on the virtualization unit 300. The administrator of corporate information systems previously installs a virtual appliance of the storage controller LPAR into the virtualization unit 300.

While the programs serve as the subject of the sentence in the description of the processes to be executed, the processor 201 actually reads the programs from the memory 202 and executes the processes in the programs.

The OS 321 is a general operating system such as Linux or Windows® and executes the programs included in the storage controller LPAR 320.

The storage controller management program 322 accesses the management server 100 via the network 130. It manages the setting of the LPAR 310 running on the physical server 200 and those of the local disk 117 and the virtual disk 125 included in the physical server 200. The storage controller management program 322 also receives a request issued by the management server 100 and transfers it to the external storage access program 323, the physical disk control program 324, and the virtual disk control program 325. The storage controller management program 322 also transfers the request to the LPAR control program 301 and the resource allocation program 302 of the virtualization unit 300.

When the external storage connection program 323 accesses an external storage connection program 323 of a storage controller LPAR 320 on a different physical server 200 via the network 130, it transmits or receives a disk I/O command issued to the virtual disk 125 by the LPAR 310. The external storage access program 323 also accesses the physical disk control program 324 or the virtual disk control program 325 of the storage controller LPAR 320 on the same server. It then transmits the disk I/O command thereto and receives the result of the disk I/O command therefrom.

The physical disk control program 324 receives the disk I/O command from the external storage access program 323 and executes it to the local disk 117 included in the same server.

The virtual disk control program 325 generates a virtual disk 125 corresponding to the local disk 117 in accordance with a request from the storage controller management program 322. The virtual disk control program 325 also transmits a request to generate a virtual disk adapter 124, to the resource allocation program 302 of the virtualization unit 300. It then connects the second LPAR 122 and the virtual disk 125 via the virtual disk adapter 124 generated. The virtual disk control program 325 also receives the disk I/O command from the external storage access program 323 and executes it to the virtual disk 125 on the same server. The virtual disk control program 325 also transmits a request to generate a virtual disk 125, to the LPAR control program 301 of the virtualization unit 300.

If no local disk 117 is present in the server 200, the physical disk control program 324 is not executed. Similarly, if no virtual disk 125 is present in the server 200, the virtual disk control program 325 is not executed. While the storage controller LPAR 320 includes all the programs in any case, the programs to be actually executed vary depending on the configuration of the server 200.

The information update program 326 accesses the disk sharing management program 403 of the management server 100 via the network 130 and then updates pieces of information held by the management server 100.

Figure 4:
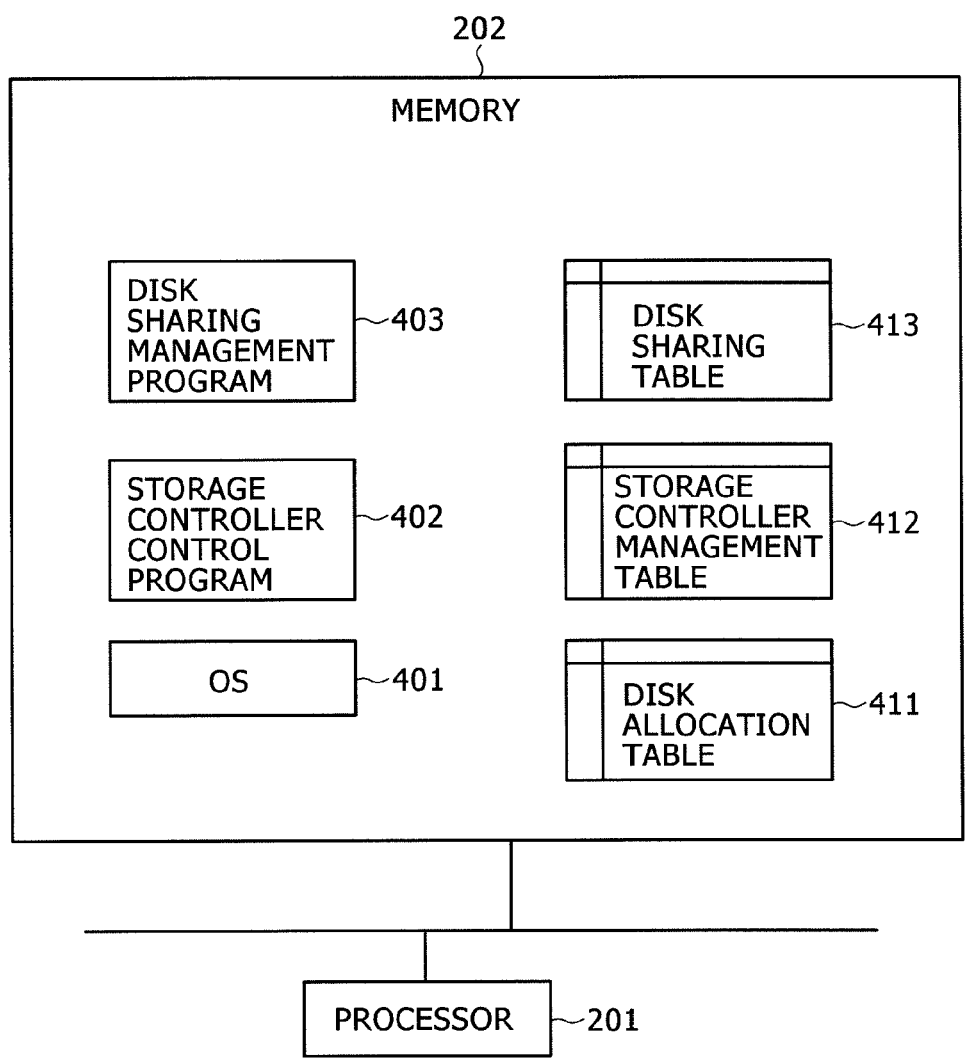
FIG. 4 is a diagram showing an example detailed configuration of a management server according to the first embodiment.

FIG. 4 is a diagram showing an example detailed configuration of the management server 100. The management server 100 stores an OS 401, a storage controller control program 402, a disk sharing management program 403, a disk allocation table 411, a storage controller management table 412, and a disk sharing table 413 in the memory 202. These programs and information are previously stored in storage media and loaded from the storage media into the memory 202. While the programs serve as the subject of the sentence in the description of the processes to be executed, the processor 201 actually reads the programs from the memory 202 and executes the processes in the programs.

The storage controller control program 402 accesses the storage controller management program 322 of the first storage controller LPAR 113 and second storage controller LPAR 123 via the network 130. It then instructs the storage controller management program 322 to start or complete a process of sharing the local disk 117 between the first LPAR 112 and the second LPAR 122.

The disk sharing management program 403 manages the entire disk sharing process by updating the pieces of information in the disk allocation table 411, the storage controller management table 412, and the disk sharing table 413 held by the management server 100.

The configuration of the management server 100 is not limited to that shown in FIG. 4 and may be a configuration virtualized by the virtualization unit 300 as shown in FIG. 3. In this case, the programs and the tables included in the management server 100 correspond to the program 311 included in the LPAR 310.

FIG. 5 is a diagram showing an example of the disk allocation table 411. The format of the disk allocation table 411 shown in FIG. 5 is illustrative only and not limiting.

The disk allocation table 411 is a table for managing the allocation state of all disks present in the system, including the local disk 117 and the virtual disk 125. The disk allocation table 411 contains disk identifiers (hereafter referred to as IDs) 501 for uniquely identifying the disks, disk types 502 for identifying the types of the disks, a physical disk adapter ID 503 for uniquely identifying the physical adapter connected to the disk, virtual disk adapter IDs 504 for uniquely identifying the virtual adapters connected to the disks, and LPAR IDs 505 for uniquely identifying the LPARs to which the disks are allocated.

Information for determining the disk type such as physical disk or virtual disk is stored in the disk type field 502. If the disk type is physical disk, the implementation method of the physical disk, such as hard disk drive (HDD) or solid-state drive (SSD), may be stored. If the disk type is virtual disk, the type or version of the program that has generated the virtual disk may be stored. By referring to these pieces of information, the administrator of the corporate information systems can select a disk to be shared in consideration of the performance or characteristics of the disks.

If the disk type is virtual disk and there is no physical disk adapter connected to the virtual disk, the physical disk adapter ID field 503 may be blank.

FIG. 6 is a diagram showing an example of the storage controller management table 412. The format of the storage controller management table 412 shown in FIG. 6 is illustrative only and not limiting.

The storage controller management table 412 is a table for managing all storage controllers present in the system, including the storage controller LPAR 320. The storage controller management table 412 contains storage controller IDs 601 for uniquely identifying the storage controllers, storage controller types 602 for identifying the types of the storage controllers, storage controller addresses 603 for accessing the storage controllers, managed disk IDs 604 representing a list of disks managed by the storage controllers, and managed LPARs 605 representing a list of LPARs managed by the storage controllers.

Pieces of information for identifying the types of the storage controllers are stored in the storage controller type field 602. For example, if the system includes a storage controller which differs in implementation from the storage controller LPAR 320, such as a storage controller for shared storage, information representing the implementation may be stored in the storage controller type field 602.

Destination addresses, such as IP addresses, specified by the management server 100, the virtualization unit 300, the LPAR 310, the storage controller LPAR 320, or the like in order to access the storage controllers are stored in the address field 603.

The IDs of the local disk 117 and the virtual disk 125 managed by the storage controllers are stored in the managed disk ID field 604. The storage controllers manage the local disk 117 included in the servers on which the storage controllers are running or the virtual disk 125 generated on the servers. For example, the first storage controller LPAR 113 in FIG. 1 manages the local disk 117 included in the first server 110, and the second storage controller LPAR 123 in FIG. 1 manages the virtual disk 125 generated on the second server 120.

FIG. 7 is a diagram showing an example of the disk sharing table 413. The format of the disk sharing table 413 shown in FIG. 7 is illustrative only and not limiting.

If the first LPAR 112 and the second LPAR 122 share the local disk 117, the disk sharing table 413 manages the relationship between the local disk 117 and the corresponding virtual disk 125.

The disk sharing table 413 contains a local disk ID 701 for identifying the local disk 117 to be shared included in the first server 110, a first LPAR ID 702 for uniquely identifying the first LPAR 112, which is running on the first server 110 and to which the local disk 117 has been allocated, a virtual disk ID 703 for uniquely identifying the virtual disk 125 newly generated on the second server 120 and corresponding to the local disk 117, and a second LPAR ID 704 for uniquely identifying the second LPAR 122, which is running on the second server 120 and to which the virtual disk 125 has newly been allocated.

Insertion of a new row into the disk sharing table 413 means that sharing of a disk newly starts. Similarly, deletion of a row from the disk sharing table 413 means that sharing of a disk completes. The disk sharing table 413 shows the correspondence between the local disk 117 and the virtual disk 125. Accordingly, when the first storage controller LPAR 113 or the second storage controller LPAR 123 refers to the disk sharing table 413, it can identify the virtual disk 125 corresponding to the local disk 117.

Next, a process of starting to share the local disk 117 included in the first server 110 between the first LPAR 112 running on the first server 110 and the second LPAR 122 running on the second server 120 according to the first embodiment will be described with reference to the flowchart of FIG. 8.

Figure 9A:
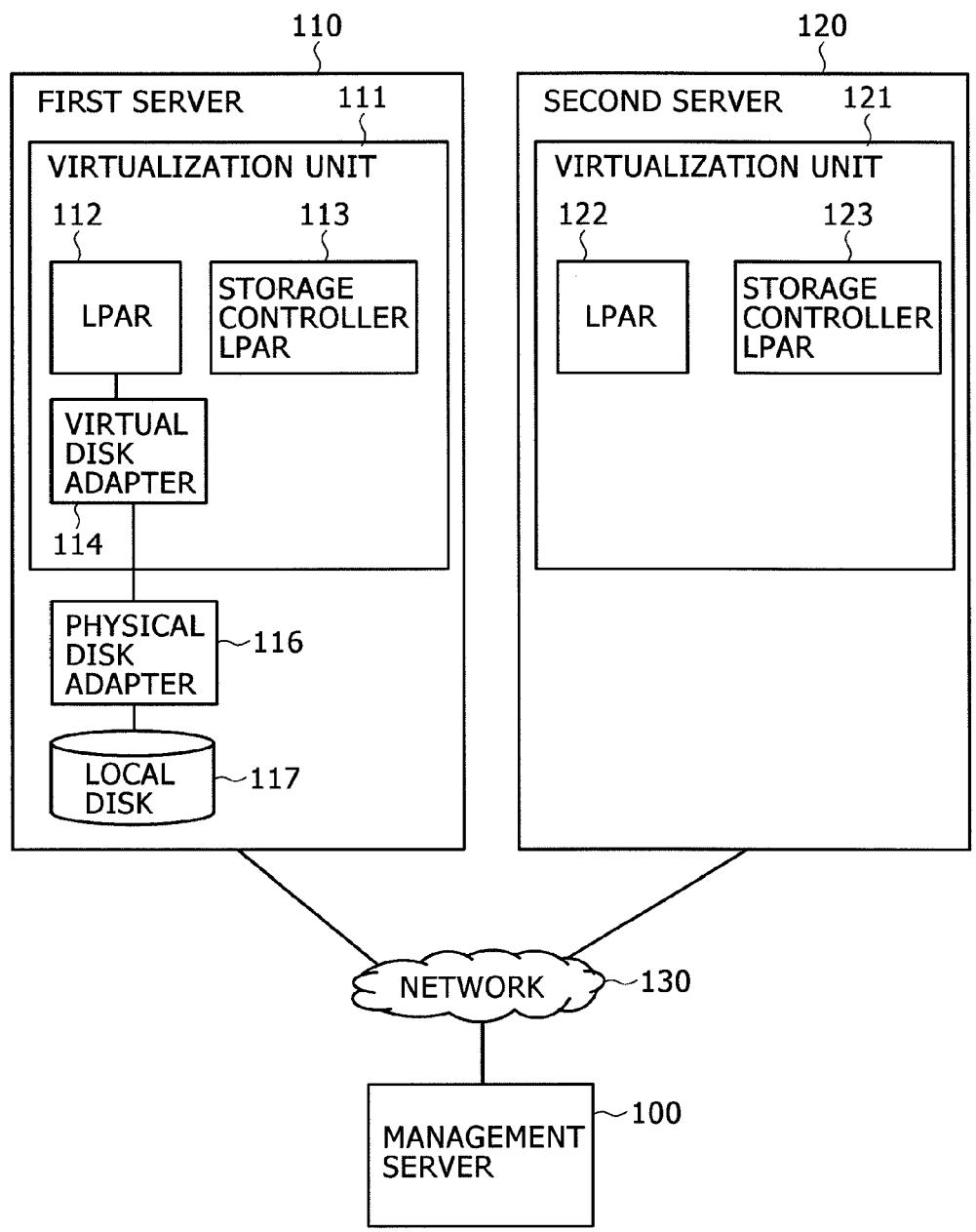
FIG. 9A is a diagram showing an example configuration of the system before starting to share a disk according to the first embodiment.

FIGS. 9A and 9B show an example of the state of the system before starting this process. Specifically, FIG. 9A shows the configuration of the system, and FIG. 9B shows the respective states of the disk allocation table 411 of FIG. 5, the storage controller management table 412 of FIG. 6, and the disk sharing table 413 of FIG. 7. Hereafter, only the differences between FIGS. 9A and 9B and FIGS. 1 and 5 to 7 will be described. No virtual disk adapter is allocated to any of the first storage controller LPAR 113, the second LPAR 122, and the second storage controller LPAR 123. Nor are these LPARs connected to any disk in the diagram. Here, it is assumed that the first LPAR 112 and the second LPAR 122 need to share the local disk 117.

Figure 8:
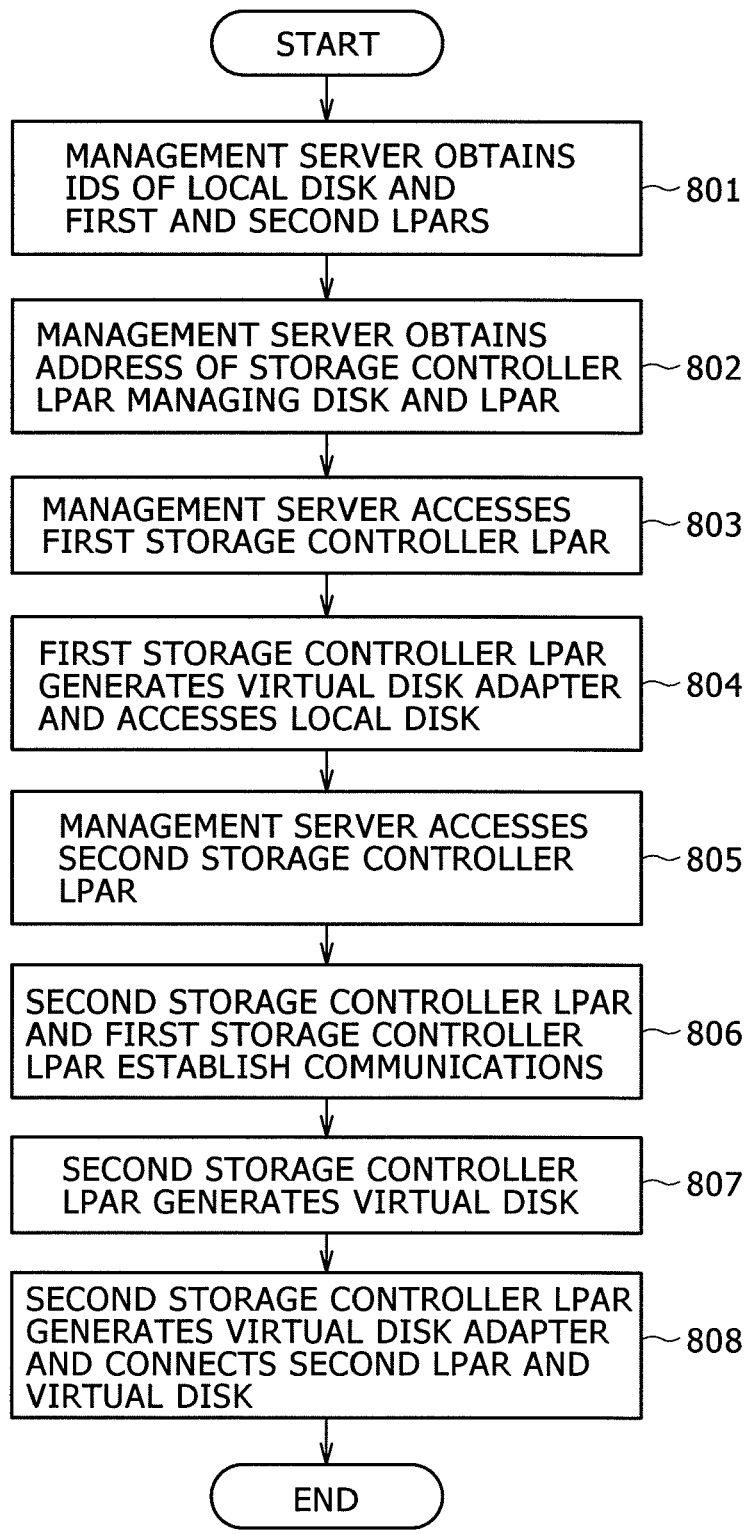
FIG. 8 is a flowchart showing an example of a disk sharing start process according to the first embodiment.

FIG. 8 is a flowchart showing an example of a process of starting to share the local disk between the LPARs. This process is performed, for example, in response to that the administrator transmits a request to start to share the local disk 117 between the first LPAR 112 and the second LPAR 122 to the management server 100. At this time, the transmitter of the request transmits the ID of the first LPAR 112, the ID of the second LPAR 122, and the ID of the local disk 117 to be shared to the disk sharing management program 403 of the management server 100. This process may be performed in response to not only that the administrator transmits the request but also that any program transmits the request.

In step 801, the disk sharing management program 403 of the management server 100 receives the disk sharing start request and the IDs of the first LPAR 112, the second LPAR 122, and the local disk 117 to be shared. Subsequently, the disk sharing management program 403 inserts a new row into the disk sharing table 413 and records the received IDs of the local disk 117, the first LPAR 112, and the second LPAR 122 in the local disk ID field 701, the first LPAR ID field 702, and the second LPAR ID field 704, respectively, of the disk sharing table 413. Since no virtual disk has been generated at this time, the virtual disk ID field 703 is blank.

In step 802, the disk sharing management program 403 of the management server 100 searches the managed disk ID field 604 of the storage controller management table 412 on the basis of the ID of the local disk obtained in step 801 and obtains the address of the first storage controller LPAR 113 managing the local disk 117 from the address field 603 thereof. Subsequently, the disk sharing management program 403 searches the managed LPAR field 605 of the storage controller management table 412 on the basis of the ID of the first LPAR obtained in step 801 and obtains the address of the first storage controller LPAR 113 managing the first LPAR 112 from the address field 603 thereof. Similarly, the disk sharing management program 403 obtains the address of the second storage controller LPAR 123 managing the second LPAR 122.

Refer to FIG. 6. When the disk sharing management program 403 searches the storage controller management table 412 using the ID of the local disk 117, Disk 1-1, as a key, it receives the row containing the ID of the first storage controller LPAR, LPAR1-2. By referring to the address field 603 of the row retrieved, the disk sharing management program 403 finds that the address of the first storage controller LPAR managing the local disk 117 is 192.0.2.10.

When the storage controller management table 412 is searched, multiple rows of storage controller may be found. The purpose of managing a single local disk or LPAR using multiple storage controllers is often to make the redundant storage controller. In such cases, the administrator previously records information such as the redundant configuration of the master and slave storage controller, in the storage controller type field 602. Thus, when multiple storage controllers are found, the disk sharing management program 403 determines which of the storage controller should be selected.

In step 803, using the address of the first storage controller LPAR 113 obtained in step 802, the storage controller control program 402 of the management server 100 transmits to the first storage controller LPAR 113 a command to start to share a disk, the ID of the local disk 117 to be shared obtained in step 801, the ID of the first LPAR 112, and the ID of the second LPAR 122, as well as the address of the second storage controller LPAR 123 obtained in step 802.

In step 804, the storage controller management program 322 of the first storage controller LPAR 113 receives the information transmitted by the management server 100 in step 803, such as the command and the IDs. Subsequently, the storage controller management program 322 transmits a request to generate a virtual disk adapter, the ID of the local disk 117, and the ID of the first storage controller LPAR 113 to the resource allocation program 302 of the first virtualization unit 111. To transmit the request and the IDs to the first virtualization unit 111, the storage controller management program 322 uses a special command by which an LPAR can transmit information to a virtualization unit, such as a hyper call. Alternatively, the storage controller management program 322 may access the virtualization unit via the network and issue an application program interface (API) command provided by the virtualization unit.

The resource allocation program 302 receives the information from the storage controller management program 322 and generates a virtual disk adapter 115. It also generates an ID for uniquely identifying the virtual disk adapter 115. It also allocates the virtual disk adapter 115 to the first storage controller LPAR 113 on the basis of the ID of the first storage controller LPAR 113 and connects the virtual disk adapter 115 to the local disk 117 on the basis of the ID of the local disk 117. The resource allocation program 302 then transmits the ID generated to the storage controller management program 322. This process allows the first storage controller LPAR 113 to issue a disk I/O command to the local disk 117 and read or write data therefrom or thereto. The processes performed by the resource allocation program 302 at this time are a virtual disk adapter generation process and a physical disk allocation process which are generally performed by the virtualization unit 111. The ID of the virtual disk adapter is, for example, a world wide name (WWN) or the like.

Subsequently, the storage controller management program 322 accesses the management server 100 via the information update program 326 and updates the disk allocation table 411. Specifically, the information update program 326 searches the disk ID field 501 of the disk allocation table 411 on the basis of the ID of the local disk 117 and registers the ID of the virtual disk adapter 115 received from the resource allocation program 302 in the virtual disk adapter ID field 504 of the row retrieved. The information update program 326 also registers the ID of the first storage controller LPAR 113, to which the virtual disk adapter 115 has been allocated, in the LPAR ID field 505.

After generating the virtual disk adapter 115, the first storage controller LPAR 113 waits for access from the second storage controller LPAR 123.

Figure 10A:
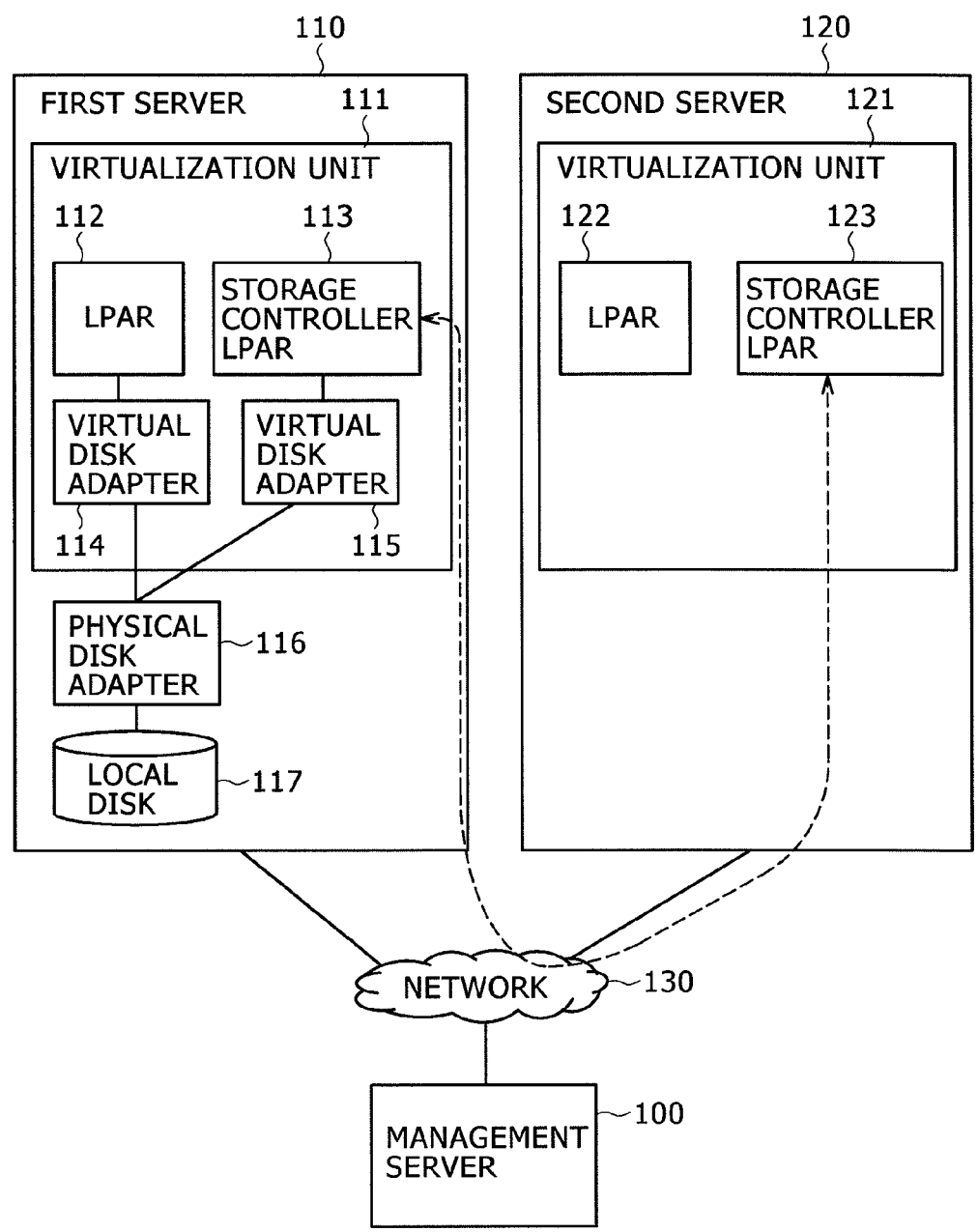
FIG. 10A is a diagram showing an example configuration of the system in a local disk access step according to the first embodiment.

FIGS. 10A and 10B show an example of the state of the system at this time. Compared to FIG. 9, the virtual disk adapter 115 is newly generated, and the first storage controller LPAR 113 accesses the local disk 117 via the virtual disk adapter 115.

In step 805, using the address of the second storage controller LPAR 123 obtained in step 802, the storage controller control program 402 of the management server 100 transmits to the second storage controller LPAR 123 a command to start to share the disk, the ID of the local disk 117 to be shared obtained in step 801, the ID of the first LPAR 112, and the ID of the second LPAR 122, as well as the address of the first storage controller LPAR 113 obtained in step 802.

In step 806, the storage controller management program 322 of the second storage controller LPAR 123 receives the information transmitted by the management server 100 in step 805, such as the command and the IDs. The storage controller management program 322 then transmits a request to access the first storage controller LPAR 113, to the external storage access program 323.

Using the address of the first storage controller LPAR 113 received in step 805, the external storage access program 323 transfers the access request to the first storage controller LPAR 113 via the network 130. When the external storage access program 323 of the first storage controller LPAR 113 receives the access request from the second storage controller LPAR 123, it establishes communications with the first storage controller LPAR 113 and the second storage controller LPAR 123. "Establish communications" as used herein refers to making a preparation so that both parties can transmit or receive information to or from each other, for example, establishing an IP (Internet protocol) session.

In step 807, the storage controller management program 322 transmits a request to generate a virtual disk, the ID of the second LPAR 122, and the ID of the second storage controller LPAR 123 to the virtual disk control program 325.

The virtual disk control program 325 receives the information from the storage controller management program 322 and generates a virtual disk 125. The virtual disk control program 325 also generates an ID for uniquely identifying the virtual disk 125 generated.

At this time, the virtual disk control program 325 generates the virtual disk 125 by emulating the local disk 117. The virtual disk 125 can receive a disk I/O command such as a SCSI command. That is, the virtual disk 125 has an ID which can be specified as the destination of a disk I/O command, for example, a logical unit number (LUN).

After generating the virtual disk 125, the virtual disk control program 325 transmits the ID of the virtual disk 125 generated to the storage controller management program 322.

Subsequently, the storage controller management program 322 accesses the management server 100 via the information update program 326 and updates the disk allocation table 411. Specifically, the information update program 326 inserts a new row into the disk allocation table 411 and registers the ID of the virtual disk 125 received from the virtual disk control program 325 in the disk ID field 501 of the new row, information representing the virtual disk in the disk type field 502 thereof, and the ID of the second storage controller LPAR 123 in the LPAR ID field 505 thereof. Since the virtual disk 125 is not connected to a physical disk adapter, the physical disk adapter ID field 503 is left blank. Since no virtual disk adapter to be connected to the virtual disk 125 has been generated, the virtual disk adapter ID field 504 is also left blank.

Further, the storage controller management program 322 accesses the management server 100 via the information update program 326 and updates the storage controller management table 412. Specifically, the storage controller management program 322 searches the storage controller ID field 601 of the storage controller management table 412 on the basis of the ID of the second storage controller LPAR 123 and registers the ID of the virtual disk 125 in the managed disk field 604 of the row retrieved. Due to the above-mentioned process, the virtual disk 125 is placed under the control of the second storage controller LPAR 123.

Figure 11A:
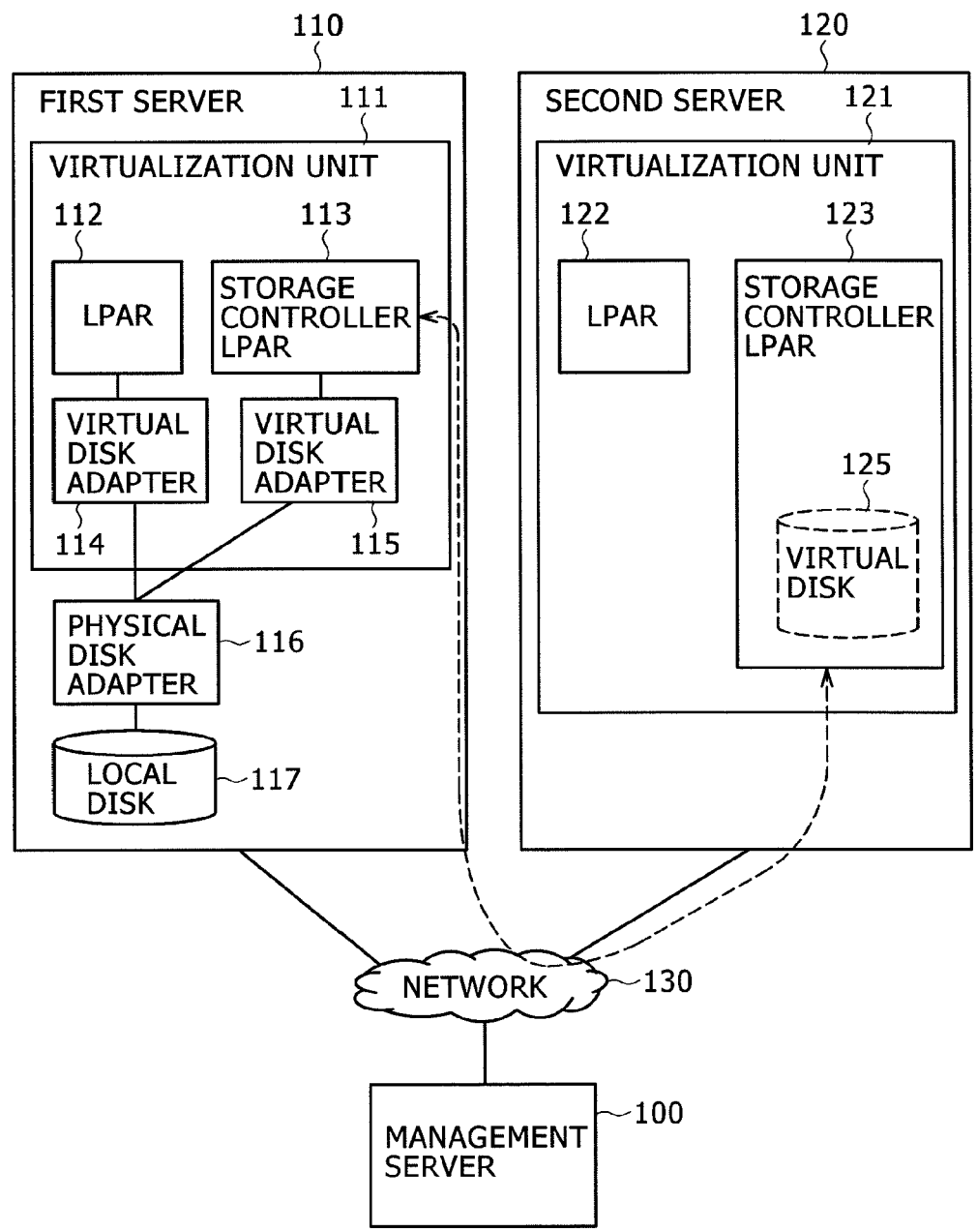
FIG. 11A is a diagram showing an example configuration of the system in a virtual disk generation step according to the first embodiment.

FIGS. 11A and 11B show an example of the state of the system at this time. Compared to FIG. 10, the virtual disk 125 is newly generated on the second storage controller LPAR 123.

In step 808, the storage controller management program 322 transmits a request to generate a virtual disk adapter, the ID of the second LPAR 122, the ID of the second storage controller LPAR 123, and the ID of the virtual disk 125 to the resource allocation program 302 of the second virtualization unit 121 using a hyper call, API, or the like.

The resource allocation program 302 receives the information from the storage controller management program 322, generates a virtual disk adapter 124, allocates the virtual disk adapter 124 to the second LPAR 122 on the basis of the ID of the second LPAR 122, and connects the virtual disk adapter 124 to the virtual disk 125 on the basis of the ID of the virtual disk 125. The virtual disk adapter 124 holds the ID of the second storage controller LPAR 123 transmitted by the storage controller management program 322. The resource allocation program 302 also generates an ID of the virtual disk adapter 124 and returns it to the storage controller management program 322, as in steps 804 and 807.

Subsequently, the storage controller management program 322 accesses the management server 100 via the information update program 326 and updates the disk allocation table 411. Specifically, the information update program 326 searches the disk ID field 501 of the disk allocation table 411 on the basis of the ID of the virtual disk 125 and registers the ID of the virtual disk adapter 124 received from the resource allocation program 302 in the virtual disk adapter ID field 504 of the row retrieved and the ID of the second LPAR 122 in the LPAR ID field 505 thereof.

Further, the storage controller management program 322 accesses the management server 100 via the information update program 326 and updates the disk sharing table 413. Specifically, the storage controller management program 322 searches the local disk ID field 701 of the disk sharing table 413 on the basis of the ID of the local disk 117. The storage controller management program 322 then registers the ID of the virtual disk 125 generated in step 807 in the blank virtual disk ID field 703 of the row where the ID of the local disk 117 has been found by the search.

Due to the above-mentioned steps, the first storage controller LPAR 113 of the first server 110 and the second storage controller LPAR 123 of the second server 120 share the disk sharing table 413 via the management server 100. This makes it possible to specify the virtual disk 125 corresponding to the local disk 117 and start to share the local disk 117 between the first LPAR 112 and the second LPAR 122. Thus, the second LPAR 122 can read data stored in the local disk 117 or write data thereto by issuing a disk I/O command to the virtual disk adapter 124.

An example of the system configuration at this time is shown in FIG. 1, and the states of the disk allocation table 411, the storage controller management table 412, and the disk sharing table 413 are shown in FIGS. 5 to 7, respectively.

Next, the process in which the second LPAR 122 issues a disk I/O command to the virtual disk adapter 124 and reads data stored in the local disk 117 or writes data thereto will be described with reference to the flowchart of FIG. 12.

In step 1201, the program 311 running on the second LPAR 122 issues a disk I/O command to the virtual disk adapter 124 allocated to the second LPAR 122 by the second virtualization unit 121.

This disk I/O command is a general command issued by the program 311 running on the second LPAR 122 via the virtual disk adapter 124 in order to read data stored in the virtual disk 125 or write data thereto. The disk I/O command is, for example, an SCSI command. Accordingly, the disk I/O command contains the ID of the local disk 117, to which the command is to be issued, and the details of the I/O operation.

In step 1202, the virtual disk adapter 124 receives the disk I/O command issued by the second LPAR 122. In a general virtualization unit, the disk I/O command issued by the second LPAR 122 is a special command to be processed by the virtualization unit 121. For this reason, the disk I/O command is trapped by the LPAR control program 301 of the virtualization unit 121, and the program 207 to be processed by the processor 201 is transferred from the second LPAR 122 to the virtual disk adapter 124. Accordingly, "receiving the disk I/O command" refers to, for example, a process where the disk I/O command received by the LPAR control program 301 in the trap process is passed to the virtual disk adapter 124.

Subsequently, the virtual disk adapter 124 transfers the disk I/O command to the second storage controller LPAR 123 using the ID of the second storage controller LPAR 123 received by the virtual disk adapter 124 in step 808. At this time, the virtual disk adapter 124 transfers the disk I/O command, for example, by issuing an interrupt to the second storage controller LPAR 123 via the LPAR control program 301.

In step 1203, the virtual disk control program 325 of the second LPAR 122 receives the disk I/O command transferred by the virtual disk adapter 124 and transfers it to the external storage access program 323 of the second storage controller LPAR 123.

Subsequently, the external storage access program 323 refers to the storage controller management table 412 of the management server 100 via the storage controller management program 322. The external storage access program 323 then searches the managed disk field 604 of the storage controller management table 412 on the basis of the ID of the local disk 117 contained in the disk I/O command. The external storage access program 323 then obtains the address of the first storage controller LPAR 113 from the address field 603 of the row retrieved. Instead of accessing the management server 100, the external storage access program 323 may previously cache a combination of the ID of the local disk 117 and the address of the first storage controller LPAR 113 within itself and refer to the combination.

Subsequently, using the address obtained, the external storage access program 323 transfers the disk I/O command to the first storage controller LPAR 113 through the communication established in step 806 via the network 130. At this time, the external storage access program 323 transfers the disk I/O command by adding a header to the disk I/O command in accordance with a communication protocol adopted by the network 130, such as IP, so as to capsulate the disk I/O command and then transmitting the disk I/O command capsulated via the network 130. For example, iSCSI is used.

In step 1204, the external storage access program 323 of the first storage controller LPAR 113 receives the capsulated disk I/O command transferred by the second storage controller LPAR 123. Subsequently, the external storage access program 323 of the first storage controller LPAR 113 extracts the disk I/O command by eliminating the header added by the external storage access program 323 of the second storage controller LPAR 123 from the capsulated disk I/O command. The external storage access program 323 of the first storage controller LPAR 113 then transfers the disk I/O command to the physical disk control program 324 of the first storage controller LPAR 113 on the basis of the ID of the local disk 117 contained in the disk I/O command.

The physical disk control program 324 issues the disk I/O command to the local disk 117 via the virtual disk adapter 115. The physical disk control program 324 then receives the result of the disk I/O command issued to the local disk 117, via the virtual disk adapter 115. The process in which the physical disk control program 324 issues the disk I/O command and receives the result thereof is a disk I/O operation performed by a general virtualization unit.

In step 1205, the physical disk control program 324 of the first storage controller LPAR 113 transfers the result of the disk I/O command to the external storage access program 323 of the first storage controller LPAR 113.

Subsequently, the external storage access program 323 refers to the disk sharing table 413 of the management server 100 via the storage controller management program 322 and then searches the local disk ID field 701 of the disk sharing table 413 on the basis of the ID of the local disk 117 contained in the disk I/O command. The external storage access program 323 then obtains the ID of the virtual disk 125 corresponding to the local disk 117 from the virtual disk field ID 703 of the row retrieved. The external storage access program 323 then searches the managed disk ID field 604 of the storage controller management table 412 of the management server 100 on the basis of the ID of the virtual disk 125 and obtains the address of the second storage controller LPAR managing the virtual disk 125 from the address field 603 of the row retrieved. Instead of accessing the management server 100, the external storage access program 323 may previously cache a combination of the ID of the local disk 117, the ID of the virtual disk 125, and the address of the second storage controller LPAR 123 within itself and refer to the combination.

Subsequently, using the address obtained, the external storage access program 323 transfers the result of the disk I/O command to the second storage controller LPAR 123. At this time, the result of the disk I/O command is transferred in the same method as that described in step 1203. That is, the external storage access program 323 capsulates the result of the disk I/O command by adding a header to it in accordance with a communication protocol adopted by the network 130, and transfers the capsulated result of the disk I/O command via the network 130.

In step 1206, the external storage access program 323 of the second storage controller LPAR 123 receives the capsulated result of the disk I/O command transferred by the first storage controller LPAR 113. The external storage access program 323 of the second storage controller LPAR 123 then extracts the result of the disk I/O command by eliminating the header added by the external storage access program 323 of the first storage controller LPAR from the capsulated result of the disk I/O command. The external storage access program 323 of the second storage controller LPAR 123 then transfers the result of the disk I/O command to the virtual disk control program 325.

Subsequently, the virtual disk control program 325 transfers the result of the disk I/O command to the second LPAR 122. Specifically, the virtual disk control program 325 transfers the result of the disk I/O command to the virtual disk adapter 124 of the second virtualization unit 121 using, e.g., a hyper call, API, or the like. The virtual disk adapter 124 transfers the result of the disk I/O command to the second LPAR 122 using a command by which a virtualization unit can transmit information to an LPAR, such as an interrupt command.

The above-mentioned steps constitute the process in which the second LPAR 122 issues an I/O command to the virtual disk adapter 124 and reads data stored in the local disk 117 or writes data thereto. This is advantageous in that both a cost reduction owing to making expensive shared storage unnecessary and using a low-cost local disk and convenience owing to sharing a disk can be achieved.

What is claimed is:

1. A method for sharing a disk in a system including a plurality of physical servers and a management server connected to the physical servers,
    wherein a first physical server comprises a local disk, a first virtualization unit, and a first LPAR and a first storage controller LPAR logically partitioned by the first virtualization unit,
    wherein a second physical server comprises a second virtualization unit, a second LPAR and a second storage controller LPAR logically partitioned by the second virtualization unit, and a virtual disk generated by the second storage controller by emulating the local disk of the first physical server,
    wherein the first storage controller LPAR and the second storage controller LPAR communicate with each other,
    the method comprising:
    transferring, by the second storage controller LPAR, a disk I/O command to be executed to the virtual disk issued by the second storage controller LPAR to the first storage controller LPAR; and
    obtaining, by the first storage controller LPAR, an identifier of the local disk contained in the disk I/O command and executing the disk I/O command to the local disk having the identifier obtained.

2. The method for sharing a disk according to claim 1, further comprising:
    transferring, by the first storage controller LPAR, a result of the executed disk I/O command to the second storage controller LPAR; and
    transferring, by the second storage controller LPAR, the transferred result of the disk I/O command to the second LPAR.

3. The method for sharing a disk according to claim 1, wherein the disk I/O command comprises an identifier of a local disk and details of a process, the local disk being a disk to which a command is to be issued.

4. The method for sharing a disk according to claim 1, wherein the first storage controller LPAR accesses the local disk via a first virtual disk adapter, and
    wherein the second LPAR accesses the second storage controller LPAR via a second virtual disk adapter.

5. The method for sharing a disk according to claim 1, wherein the management server contains a disk sharing table for managing a correspondence among the first LPAR, the local disk, the second LPAR, and the virtual disk,
    the method further comprising:
    obtaining, by the first storage controller LPAR, an identifier of the local disk contained in the disk I/O command;

obtaining, by the first storage controller LPAR, an identifier of the virtual disk corresponding to the obtained identifier of the local disk by referring to the disk sharing table; and transferring, by the first storage controller LPAR, a result of the executed disk I/O command to the second storage controller LPAR that has generated the virtual disk having the obtained identifier.

6. The method for sharing a disk according to claim 4, wherein the second LPAR issues the disk I/O command to the second virtual disk adapter, and the second virtual disk adapter receives the disk I/O command issued and transfers the received disk I/O command to the second storage controller LPAR.

7. The method for sharing a disk according to claim 1, wherein the second storage controller LPAR refers to the identifier of the local disk contained in the disk I/O command and transfers the disk I/O command to the first storage controller LPAR managing the local disk corresponding to the identifier referred to.

8. The method for sharing a disk according to claim 1, wherein the first LPAR accesses the local disk via a third virtual disk adapter.

9. The method for sharing a disk according to claim 1, further comprising:
generating, by the second storage controller LPAR, an identifier of the virtual disk and registering the generated identifier of the virtual disk in the disk sharing table.

10. The method for sharing a disk according to claim 1, wherein the management server contains a storage controller management table for managing a correspondence between the local disk and the first storage controller LPAR, an address of the first storage controller LPAR, a correspondence between the virtual disk and the second storage controller LPAR, and an address of the second storage controller LPAR.

11. The method for sharing a disk according to claim 1, wherein the management server contains a disk allocation table for managing a correspondence among the identifier of the local disk and an identifier of the virtual disk, a type of the local disk and a type of the virtual disk, an identifier of the first virtual disk adapter and an identifier of the second virtual disk adapter, and an identifier of the first LPAR and an identifier of the second LPAR.

12. A computer system for sharing a disk, comprising:
a first physical server including:
 a local disk;
 a first virtualization unit; and
 a first LPAR and a first storage controller logically partitioned by the first virtualization unit;
a second physical server including:
 a second virtualization unit;
 a second LPAR and a second storage controller LPAR logically partitioned by the second virtualization unit; and
 a virtual disk generated by the second storage controller LPAR by emulating the local disk of the first physical server; and
a management server connected to the first and second physical servers,
wherein the first storage controller LPAR and the second storage controller LPAR communicate with each other,
wherein the second storage controller LPAR includes a portion that transfers a disk I/O command to be executed to the virtual disk issued by the second LPAR to the first storage controller LPAR, and
wherein the first storage controller LPAR includes:
a portion that obtains an identifier of the local disk contained in the disk I/O command by referring to the disk I/O command; and
a portion that executes the disk I/O command to the local disk having the obtained identifier of the first physical server.

\* \* \* \* \*